US009777142B2

(12) United States Patent
Sandholzer et al.

(10) Patent No.: US 9,777,142 B2
(45) Date of Patent: Oct. 3, 2017

(54) HIGH FLOW POLYOLEFIN COMPOSITION WITH HIGH STIFFNESS AND TOUGHNESS

(71) Applicant: BOREALIS AG, Vienna (AT)

(72) Inventors: Martina Sandholzer, Linz (AT); Susanne Kahlen, Leonding (AT); Georg Grestenberger, St. Peter in der Au (AT)

(73) Assignee: BOREALIS AG, Vienna (AT)

( * ) Notice: Subject to any disclaimer, the term of this patent is extended or adjusted under 35 U.S.C. 154(b) by 100 days.

(21) Appl. No.: 14/911,300

(22) PCT Filed: Aug. 18, 2014

(86) PCT No.: PCT/EP2014/067533
§ 371 (c)(1),
(2) Date: Feb. 10, 2016

(87) PCT Pub. No.: WO2015/024887
PCT Pub. Date: Feb. 26, 2015

(65) Prior Publication Data
US 2016/0185946 A1  Jun. 30, 2016

(30) Foreign Application Priority Data
Aug. 21, 2013  (EP) .................... 13181231

(51) Int. Cl.
C08L 23/16  (2006.01)
C08L 23/10  (2006.01)
C08L 23/14  (2006.01)

(52) U.S. Cl.
CPC ............. C08L 23/16 (2013.01); C08L 23/10 (2013.01); C08L 23/14 (2013.01); C08L 2205/025 (2013.01); C08L 2205/03 (2013.01); C08L 2207/02 (2013.01)

(58) Field of Classification Search
CPC .......... C08L 23/00; C08L 23/14; C08L 23/16; C08L 2205/025; C08L 2207/02; C08L 2205/03
See application file for complete search history.

(56) References Cited
U.S. PATENT DOCUMENTS

| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,691,043 A | 11/1997 | Keller et al. |
| 5,693,838 A | 12/1997 | Sangokoya et al. |
| 5,731,253 A | 3/1998 | Sangokoya |
| 5,731,451 A | 3/1998 | Smith et al. |
| 5,744,656 A | 4/1998 | Askham |
| 6,316,562 B1 | 11/2001 | Munck et al. |
| 6,322,883 B1 | 11/2001 | Williams |

(Continued)

FOREIGN PATENT DOCUMENTS

| CN | 101563226 A | 11/1997 |
| CN | 1248198 A | 3/2000 |

(Continued)

OTHER PUBLICATIONS

Japanese Patent Office, Notice of Reasons for Rejection issued in Japanese Patent Application No. 2016-535439 (dated Mar. 28, 2017).
"Glossary of Basic Terms in Polymer Science (IUPAC Recommendations 1996)," Pure Appl. Chem., 68(8):1591-1595 (1996).
"MDO Film—Oriented PE and PP packaging film," IN0128/GB FF 2004 10, Borealis A/S (2004).
Abiru et al., "Microstructural Characterization of Propylene-Butene-1 Copolymer Using Temperature Rising elution Fractionation," J. Appl. Polymer Sci 68:1493-1501 (1998).
Atwood, "Chapter 6: Anionic and Cationic Organoaluminum Compounds," Coord. Chem. Alum., VCH, New York, NY, pp. 197-232 (1993).
Britovsek et al., "The Search for New-Generation Olefin Polymerization Catalysts: Life beyond Metallocenes," Agnew. Chem. Int. Ed., vol 38(4), pp. 428-447 (1999).

(Continued)

Primary Examiner — Nathan M Nutter
(74) Attorney, Agent, or Firm — Leydig, Voit & Mayer, Ltd.

(57) ABSTRACT

The present invention relates to a polyolefin composition comprising two heterophasic propylene copolymers which differ in the intrinsic viscosity of their xylene soluble fractions.

16 Claims, No Drawings

(56) References Cited

U.S. PATENT DOCUMENTS

| | | |
|---|---|---|
| 6,586,528 B1 | 7/2003 | Delaite et al. |
| 6,642,317 B1 | 11/2003 | Delaite et al. |
| 7,342,078 B2 | 3/2008 | Schottek et al. |
| 7,378,472 B2 | 5/2008 | Fell et al. |
| 7,569,651 B2 | 8/2009 | Schottek et al. |
| 8,709,561 B2 | 4/2014 | Bernreitner et al. |
| 8,779,062 B2 | 7/2014 | Paavilainen et al. |
| 8,889,792 B2 | 11/2014 | Paavilainen et al. |
| 9,181,423 B2 | 11/2015 | Kock et al. |
| 9,243,137 B2 | 1/2016 | Reichelt et al. |
| 2003/0149199 A1 | 8/2003 | Schottek et al. |
| 2004/0033349 A1 | 2/2004 | Henderson |
| 2005/0136274 A1 | 6/2005 | Hamulski et al. |
| 2005/0187367 A1 | 8/2005 | Hori et al. |
| 2005/0200046 A1 | 9/2005 | Breese |
| 2006/0020096 A1 | 1/2006 | Schottek et al. |
| 2006/0155080 A1 | 7/2006 | Fell et al. |
| 2006/0182987 A1 | 8/2006 | Yu et al. |
| 2006/0211801 A1 | 9/2006 | Miller et al. |
| 2007/0235896 A1 | 10/2007 | McLeod et al. |
| 2008/0214767 A1 | 9/2008 | Mehta et al. |
| 2010/0029883 A1 | 2/2010 | Krajete et al. |
| 2010/0081760 A1 | 4/2010 | Rhee et al. |
| 2010/0099824 A1 | 4/2010 | Helland et al. |
| 2010/0304062 A1 | 12/2010 | Daviknes et al. |
| 2011/0031645 A1 | 2/2011 | Kuettel et al. |
| 2012/0189830 A1 | 7/2012 | Niepelt et al. |
| 2013/0045862 A1 | 2/2013 | Valonen et al. |
| 2013/0167486 A1 | 7/2013 | Aarnio et al. |
| 2013/0178573 A1 | 7/2013 | Paavilainen et al. |
| 2013/0203908 A1* | 8/2013 | Kock et al. ............. C08L 23/06 524/119 |
| 2013/0203931 A1 | 8/2013 | Paavilainen et al. |
| 2013/0236668 A1 | 9/2013 | Bernreitner et al. |
| 2014/0005324 A1 | 1/2014 | Reichelt et al. |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2017/0009068 A1* | 1/2017 | Kahlen et al. .......... C08L 23/12 |

FOREIGN PATENT DOCUMENTS

| | | |
|---|---|---|
| CN | 1823106 A | 8/2006 |
| CN | 102869719 A | 1/2013 |
| CN | 103068574 A | 4/2013 |
| CN | 103080212 A | 5/2013 |
| CN | 103347951 A | 10/2013 |
| EP | 0 045 977 B1 | 1/1987 |
| EP | 0 260 130 A1 | 3/1988 |
| EP | 0 279 586 A2 | 8/1988 |
| EP | 0 045 975 B1 | 4/1989 |
| EP | 0 045 976 B1 | 11/1989 |
| EP | 0 361 493 A1 | 4/1990 |
| EP | 0 423 101 A2 | 4/1991 |
| EP | 0 488 595 A1 | 6/1992 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 594 218 A1 | 4/1994 |
| EP | 0 279 586 B1 | 5/1994 |
| EP | 0 622 380 A1 | 11/1994 |
| EP | 0 045 977 B2 | 3/1995 |
| EP | 0 645 417 A1 | 3/1995 |
| EP | 0 728 769 A1 | 8/1996 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 028 984 B1 | 7/2001 |
| EP | 1 359 171 A1 | 11/2003 |
| EP | 1 376 516 A1 | 1/2004 |
| EP | 1 452 630 A1 | 9/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 883 080 A1 | 1/2008 |
| EP | 1 892 264 A1 | 2/2008 |
| EP | 1 923 200 A1 | 5/2008 |
| EP | 1 941 997 A1 | 7/2008 |
| EP | 1 941 998 A1 | 7/2008 |
| EP | 1 947 143 A1 | 7/2008 |
| EP | 1 990 353 A1 | 11/2008 |
| EP | 2 014 714 A1 | 1/2009 |
| EP | 2 062 936 A1 | 5/2009 |
| EP | 2 065 087 A1 | 6/2009 |
| EP | 2 075 284 A1 | 7/2009 |
| EP | 2 174 980 A1 | 4/2010 |
| EP | 2 251 361 A1 | 11/2010 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 | 2/2012 |
| EP | 1 358 252 B1 | 4/2012 |
| EP | 2 308 923 B1 | 5/2012 |
| EP | 2 487 203 A1 | 8/2012 |
| EP | 2 532 687 A2 | 12/2012 |
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 666 818 A1 | 11/2013 |
| JP | 2008-511703 A | 4/2008 |
| JP | 2013-525531 A | 6/2013 |
| JP | 2013-525532 A | 6/2013 |
| JP | 2016-528368 A | 9/2016 |
| WO | WO 87/07620 A1 | 12/1987 |
| WO | WO 92/12182 A1 | 7/1992 |
| WO | WO 92/13029 A1 | 8/1992 |
| WO | WO 92/19653 A1 | 11/1992 |
| WO | WO 92/19658 A1 | 11/1992 |
| WO | WO 92/19659 A1 | 11/1992 |
| WO | WO 92/21705 A1 | 12/1992 |
| WO | WO 93/11165 A1 | 6/1993 |
| WO | WO 93/11166 A1 | 6/1993 |
| WO | WO 93/19100 A1 | 9/1993 |
| WO | WO 94/10180 A1 | 5/1994 |
| WO | WO 94/14856 A1 | 7/1994 |
| WO | WO 95/12622 A1 | 5/1995 |
| WO | WO 95/32994 A1 | 12/1995 |
| WO | WO 97/10248 A1 | 3/1997 |
| WO | WO 97/14700 A1 | 4/1997 |
| WO | WO 97/28170 A1 | 8/1997 |
| WO | WO 97/36939 A1 | 10/1997 |
| WO | WO 98/12234 A1 | 3/1998 |
| WO | WO 98/16359 A1 | 4/1998 |
| WO | WO 98/38041 A1 | 9/1998 |
| WO | WO 98/40331 A1 | 9/1998 |

(56) References Cited

FOREIGN PATENT DOCUMENTS

| WO | WO 98/46616 A1 | 10/1998 |
|---|---|---|
| WO | WO 98/47929 A1 | 10/1998 |
| WO | WO 98/49208 A1 | 11/1998 |
| WO | WO 98/56831 A1 | 12/1998 |
| WO | WO 98/58971 A1 | 12/1998 |
| WO | WO 98/58976 A1 | 12/1998 |
| WO | WO 98/58977 A1 | 12/1998 |
| WO | WO 99/10353 A1 | 3/1999 |
| WO | WO 99/12981 A1 | 3/1999 |
| WO | WO 99/19335 A1 | 4/1999 |
| WO | WO 99/24478 A1 | 5/1999 |
| WO | WO 99/24479 A1 | 5/1999 |
| WO | WO 99/33842 A1 | 7/1999 |
| WO | WO 99/41290 A1 | 8/1999 |
| WO | WO 00/34341 A2 | 6/2000 |
| WO | WO 00/68315 A1 | 11/2000 |
| WO | WO 01/48034 A1 | 7/2001 |
| WO | WO 01/58970 A1 | 8/2001 |
| WO | WO 01/70395 A2 | 9/2001 |
| WO | WO 02/02576 A1 | 1/2002 |
| WO | WO 02/051912 A1 | 7/2002 |
| WO | WO 02/057342 A2 | 7/2002 |
| WO | WO 03/000754 A1 | 1/2003 |
| WO | WO 03/000755 A2 | 1/2003 |
| WO | WO 03/000756 A2 | 1/2003 |
| WO | WO 03/000757 A1 | 1/2003 |
| WO | WO 03/051934 A2 | 6/2003 |
| WO | WO 03/054035 A1 | 7/2003 |
| WO | WO 03/066698 A1 | 8/2003 |
| WO | WO 03/082879 A1 | 10/2003 |
| WO | WO 2004/000899 A1 | 12/2003 |
| WO | WO 2004/013193 A2 | 2/2004 |
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |
| WO | WO 2009/077287 A1 | 6/2009 |
| WO | WO 2009/092691 A1 | 7/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/052263 A1 | 5/2010 |
| WO | WO 2010/053644 A1 | 5/2010 |
| WO | WO 2010/082943 A1 | 7/2010 |
| WO | WO 2010/115878 A1 | 10/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/117032 A1 | 9/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/004507 A1 | 1/2013 |
| WO | WO 2013/007650 A1 | 1/2013 |
| WO | WO 2013/010879 A1 | 1/2013 |
| WO | WO 2013/050119 A1 | 4/2013 |
| WO | WO 2013/092615 A1 | 6/2013 |
| WO | WO 2013/092620 A1 | 6/2013 |
| WO | WO 2013/092624 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |
| WO | WO 2015/117958 A1 | 8/2015 |
| WO | WO 2015/121160 A1 | 8/2015 |
| WO | WO 2015/177094 A1 | 11/2015 |

OTHER PUBLICATIONS

Busico et al., "Alk-1-ene Polymerization in the Presence of a Monocyclopentadienyl Zirconium(IV) Acetamidinate Catalyst: Microstructural and Mechanistic Insights$^a$," *Macromol. Rapid Commun.* 28:1128-1134 (2007).

Busico et al., "Full Assignment of the $^{13}$C NMR Spectra of Regioregular Polypropylenes: Methyl and Methylene Region," *Macromolecules* 30:6251-6263 (1997).

Busico et al., "Microstructure of polypropylene," *Prog. Polym. Sci.* 26:443-533 (2001).

Castignolles et al., "Detection and quantification of branching in polyacrylates by size-exclusion chromatography (SEC) and melt-state $^{13}$C NMR spectroscopy," *Polymer*, 50(11):2373-2383, (2009).

Cheng, "$^{13}$C NMR Analysis of Ethylene-Propylene Rubbers," *Macromolecules* 17:1950-1955 (1984).

Cimmino et al., "Thermal and mechanical properties of isotactic random propylene-butene-1 copolymers," *Polymer* 19:1222-1223 (1978).

Crispino et al., "Influence of Composition on the Melt Crystallization of Isotactic Random Propylene/1-Butene Copolymers," *Makromol. Chem.* 181:1747-1755 (1980).

Filip et al., "Heteronuclear decoupling under fast MAS by a rotor-synchronized Hahn-echo pulse train, "*J. Magnet. Reson.* 176:239-243 (2005).

Fujiyama et al., "Effect of Molecular Parameters on the Shrinkage of Injection-Molded Polypropylene," *J. Appl. Polym. Sci.* 22:1225-1241 (1978).

Gahleitner et al., "Nucleation of Polypropylene Homo- and Copolymers," *International Polymer Processing* 26(1):2-20 (2011).

Galli et al., "Technology: driving force behind innovation and growth of polyolefins," *Prog. Polym. Sci.* 26:1287-1336 (2001).

Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).

Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198-S208 (2007).

Holbrey et al., "Liquid clathrate formation in ionic liquid-aromatic mixtures," *Chem. Comm.*, 2003, pp. 476-477.

Kakugo et al., "$^{13}$C NMR Determination of Monomer Sequence Distribution in Ethylene-Propylene Copolymers Prepared with δ-TiCl$_3$—Al(C$_2$H$_5$)$_2$Cl," *Macromolecules* 15:1150-1152 (1982).

(56) References Cited

OTHER PUBLICATIONS

Klimke et al., "Optimisation and Application of Polyolefin Branch Quantification by Melt-State $^{13}$C NMR Spectroscopy," *Macromol. Chem. Phys.* 207(4):382-395 (2006).

Mcauley et al., "On-line Inference of Polymer Properties in an Industrial Polyethylene Reactor," *AIChE Journal*, vol. 37, No, 6, pp. 825-835 (1991).

Myhre et al., "Oriented PE films—Expanding Opportunities with Borstar® PE," Maack Speciality Films, pp. 1-10 (2001).

Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).

Periodic Table (IUPAC 2007).

*Plastics Additives Handbook*, 5th edition, Hans Zweifel, Editor, Hanser Publishers, Munich, pp. 871-873 (2001).

*Plastics Additives Handbook*, 5th edition, Hans Zweifel, Editor, Hanser Publishers, Munich, pp. 956-965 (2001).

Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).

*Propylene Handbook*, 2$^{nd}$ *Edition*, Chapter 7.2.2 "Oriented Films," pp. 405-415, Nello Pasquini, Editor, Hanser (2005).

Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).

Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).

Resconi et al., "Highly Regiospecific Zirconocene Catalysts for the Isospecific Polymerization of Propene," *JACS* 120(10):2308-2321 (1998).

Resconi et al., "Selectivity in Propene Polymerization with Metallocene Catalysts," *Chem. Rev.* 100(4):1253-1345 (2000).

Singh et al., "Triad sequence determination of ethylene-propylene copolymers—application of quantitative $^{13}$C NMR," *Polymer Testing* 28(5):475-479 (2009).

Spaleck et al., "The Influence of Aromatic Substituents on the Polymerization Behavior of Bridged Zirconocene Catalyst," *Organometallics* 13:954-963

Spear et al., "Liquid Clathrates," *Encyclopedia of Supramolecular Chemistry*, J.L. Atwood and J.W. Steed (Eds.); Marcel Dekker: New York, pp. 804-808 (2004).

Wang et al., "Structural Analysis of Ethylene/Propylene Copolymers Synthesized with a Constrained Geometry Catalyst," *Macromolecules* 33:1157-1162 (2000).

Zhou et al., "A new decoupling method for accurate quantification of polyethylene copolymer composition and triad sequence distribution with $^{13}$C NMR," *J. Magnet. Reson.* 187:225-233 (2007).

"Polyethylene Lumicene® mPE M5510 EP," Total Refining & Chemicals, Total Ecosolutions, Belgium, Aug. 2013 (2 pgs.).

European Patent Office, International Search Report in International Application No. PCT/EP2014/067533 (dated Oct. 24, 2014).

European Patent Office, Written Opinion in International Application No. PCT/EP2014/067533 (dated Oct. 24, 2014).

European Patent Office, International Preliminary Report on Patentability in International Application No. PCT/EP2014/067533 (dated Mar. 2, 2016.

Koch et al., "Evaluation of scratch resistance in multiphase PP blends," *Polymer Testing* 26: 927-936 (2007).

State Intellectual Property Office of the People's Republic of China, First Notification of Office Action in Chinese Patent Application No. 201480045370.5 (dated Nov. 2, 2016).

\* cited by examiner

HIGH FLOW POLYOLEFIN COMPOSITION WITH HIGH STIFFNESS AND TOUGHNESS

CROSS-REFERENCE TO RELATED APPLICATIONS

This patent application is the U.S. national phase of International Application No. PCT/EP2014/067533, filed on Aug. 18, 2014, which claims the benefit of European Patent Application No. 13181231.5, filed Aug. 21, 2013, the disclosures of which are incorporated herein by reference in their entireties for all purposes.

The present invention is directed to a polyolefin composition having improved properties such as an excellent balance of stiffness, toughness and flowability. The polyolefin composition according to the present invention comprises a mixture of two defined heterophasic propylene copolymers.

Polypropylene is the material of choice in many applications as it can be tailored to specific purposes needed. For instance heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a propylene copolymer rubber, like an ethylene propylene rubber (EPR) or an ethylene propylene diene monomer polymer (EPDM). Further the heterophasic polypropylene contains a crystalline polyethylene to some extent. In the automobile industry such heterophasic polypropylene grades contain an amount of about 30 wt.-% propylene copolymer rubber, which normally is produced directly in one or two gas phase reactors or added externally to the matrix via a compounding step.

Automotive parts are increasingly produced by means of injection moulding. Injection moulding of big automotive parts, like bumpers, body panels or dashboards, requires polymers having a sufficiently low viscosity (i.e. a sufficiently high melt flow rate) but still acceptable and balance mechanical performance. However, polymers of higher melt flow rate (i.e. higher flowability) usually exhibit a lower molecular weight and thus inferior mechanical properties. The reduction in molecular weight does not only reduce the viscosity and increase the flowability but also alters or deteriorates the mechanical properties such as toughness. Hence, polymeric compositions exhibiting a combination of high flowability and excellent mechanical properties are not trivial to provide.

SUMMARY OF THE INVENTION

The object of the present invention is the provision of a polyolefin composition having high flowability in addition to excellent mechanical properties, so that the composition can be employed for the production of automotive parts, in particular big automotive parts, using e.g. injection moulding.

The inventors of the present invention have found that the above object can be attained by combining two different heterophasic propylene copolymers having defined characteristics.

Thus, the present invention provides a polyolefin composition comprising
(a) a first heterophasic propylene copolymer (HECO1) having
  (i) a melt flow rate $MFR_2$ (230° C.) measured according to ISO 1133 in the range of 15.0 to 55.0 g/10 min, and
  (ii) a xylene cold soluble content (XCS) determined according ISO 16152 (25° C.) in the range of 24 to 38 wt.-%,
  wherein further
  (iii) the intrinsic viscosity (IV) determined according to DIN ISO 1628/1 (in decalin at 135° C.) of the xylene cold soluble (XCS) fraction of the heterophasic propylene copolymer (HECO1) is in the range of 2.0 to 3.5 dl/g, and
(b) a second heterophasic propylene copolymer (HECO2) comprising a propylene homopolymer (H-PP2) and an elastomeric propylene copolymer (E2), wherein
  (i) said propylene homopolymer (H-PP2) has a melt flow rate $MFR_2$ (230° C.) measured according to ISO 1133 in the range of 15 to 400 g/10 min, like above 30 to 120 g/10 min;
  (ii) the xylene cold soluble (XCS) fraction of the second heterophasic propylene copolymer (HECO2) has an intrinsic viscosity determined according to DIN ISO 1628/1 (in decalin at 135° C.) in the range of 3.7 to 9.0 dl/g; and
  (iii) the comonomer content of the xylene cold soluble (XCS) fraction of the second heterophasic propylene copolymer (HECO2) is in the range of 10.0 to 40.0 wt.-%, like in the range of 12.0 to 30.0 wt.-%.

Preferably the second heterophasic propylene copolymer (HECO2) has a xylene cold soluble content (XCS) determined according ISO 16152 (25° C.) of below 40 wt.-%, preferably in the range of 8 to 35 wt.-%.

In one preferred embodiment the second heterophasic propylene copolymer (HECO2) fulfills the in-equation (IV)

$$0.50 \geq \left(0.241 \times \frac{c}{\text{wt.-\%}}\right) - \left(1.14 \times \frac{IV}{\text{dl/g}}\right) \quad (IV)$$

wherein
C is the comonomer content in wt.-% of the xylene cold soluble (XCS) fraction of the second heterophasic propylene copolymer (HECO2), and
IV is the intrinsic viscosity in dl/g of the xylene cold soluble (XCS) fraction of the second heterophasic propylene copolymer (HECO2).

Further preferred embodiments of the present invention are described in the attached dependent claims.

DETAILED DESCRIPTION

The mentioned above, the polyolefin composition according to the present invention comprises two specific heterophasic propylene copolymers.

The expression "heterophasic propylene copolymer" or "heterophasic" as used in the instant invention indicates that an elastomeric propylene copolymer is (finely) dispersed in a (semi) crystalline polypropylene. In other words the (semi) crystalline polypropylene constitutes a matrix in which the elastomeric propylene copolymer forms inclusions in the matrix, i.e. in the (semi) crystalline polypropylene. Thus the matrix contains (finely) dispersed inclusions being not part of the matrix and said inclusions contain the elastomeric propylene copolymer. The term "inclusion" according to this invention shall preferably indicate that the matrix and the inclusion form different phases within the heterophasic system, said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

The first heterophasic propylene copolymer (HECO1) and the second heterophasic propylene copolymer (HECO2) as employed according to the present invention are described in further detail below.

First Heterophasic Propylene Copolymer (HECO1)

As stated above, the polyolefin composition according to the present invention comprises a first heterophasic propylene copolymer (HECO1) as an essential component. It is preferred that the first heterophasic propylene copolymer (HECO1) before mixed with the other components mentioned herein comprises as polymer components only the matrix polypropylene (PP1) and dispersed therein the elastomeric propylene copolymer (E1). In other words the first heterophasic propylene copolymer (HECO1) may contain further additives but no other polymer in an amount exceeding 5 wt-%, more preferably exceeding 3 wt.-%, like exceeding 1 wt.-%, based on the total amount of the first heterophasic propylene copolymer (HECO1), more preferably based on the polymers present in the first heterophasic propylene copolymer (HECO1). One additional polymer which may be present in such low amounts is a polyethylene which is a reaction product obtained by the preparation of the first heterophasic propylene copolymer (HECO1). Accordingly it is in particular appreciated that a first heterophasic propylene copolymer (HECO1) as defined in the instant invention contains only a polypropylene (PP1), an elastomeric propylene copolymer (E1) and optionally a polyethylene in amounts as mentioned in this paragraph.

One important aspect of the instant invention is that the first heterophasic propylene copolymer (HECO1) has a rather high melt flow rate, i.e. has a melt flow rate $MFR_2$ (230° C.) of at least 15.0 g/10 min, more preferably in the range of 15.0 to 55.0 g/10 min, yet more preferably in the range of 20.0 to 50.0 g/10 min, still more preferably in the range of 20.0 to 45.0 g/10 min.

Preferably it is desired that the first heterophasic propylene copolymer (HECO1) is thermo mechanically stable. Accordingly it is appreciated that the first heterophasic propylene copolymer (HECO1) has a melting temperature ($T_m$) of at least 135° C., more preferably in the range of 135 to 168° C.

Preferably the propylene content in the heterophasic propylene copolymer (HECO1) is 83.0 to 94.0 wt-%, more preferably 85.0 to 93.0 wt-%, based on the total amount of the first heterophasic propylene copolymer (HECO1), more preferably based on the amount of the polymer components of the first heterophasic propylene copolymer (HECO1), yet more preferably based on the amount of the polypropylene (PP1) and the elastomeric propylene copolymer (E1) together. The remaining part constitutes the comonomers as defined for the polypropylene (PP1) being a propylene copolymer (R-PP1) and the elastomeric propylene copolymer (E1), respectively, preferably ethylene. Accordingly the comonomer content, preferably ethylene content is in the range of 6.0 to 17.0 wt-%, more preferably in the range of 7.0 to 15.0 wt-%.

As stated above the matrix of the first heterophasic propylene copolymer (HECO1) is the polypropylene (PP1).

The polypropylene (PP1) according to this invention constituting the matrix of the first heterophasic copolymer (HECO1) shall have a melt flow rate $MFR_2$ (230° C.) of 60 to 400 g/10 min, preferably in the range of 100 to 350 g/10 min, more preferably in the range of 150 to 300 g/10 min.

The polypropylene (PP1) can be a propylene copolymer (R-PP1) or a propylene homopolymer (H-PP1), the latter is preferred.

Accordingly it is appreciated that the polypropylene (PP1) has a comonomer content equal or below 9.0 wt-%, more preferably equal or below 7.0 wt-%, still more preferably equal or below 4.0 wt-%.

The expression propylene homopolymer, e.g. the expressions propylene homopolymer (H-PP1) and propylene homopolymer (H-PP2), used in the instant invention relates to a polypropylene that consists substantially, i.e. of more than 99.0 wt-%, such as at least 99.5 wt-%, still more preferably of at least 99.7 wt-%, like of at least 99.8 wt-%, of propylene units. In case other monomeric units are present in minor amounts, the units are selected from ethylene and/or a $C_4$ to $C_{12}$ α-olefin as described below. In a preferred embodiment only propylene units in the propylene homopolymer are detectable.

In case the polypropylene (PP1) is a propylene copolymer (R-PP1) it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the propylene copolymer (R-PP1) comprises, especially consists of, monomers copolymerizable with propylene from the group consisting of ethylene, 1-butene and 1-hexene. More specifically the propylene copolymer (R-PP1) comprises—apart from propylene—units derivable from ethylene and/or 1-butene. In a preferred embodiment the propylene copolymer (R-PP1) comprises units derivable from ethylene and propylene only. The comonomer content in the propylene copolymer (R-PP1) is preferably in the range of more than 1.0 to 9.0 wt-%, still more preferably in the range of more than 1.0 to 7.0 wt-%.

The polypropylene (PP1) can have a xylene cold soluble content (XCS) in a broad range, i.e. up to 5.0 wt.-%. Accordingly the polypropylene (PP1) may have a xylene cold soluble content (XCS) in the range of 0.3 to 5.0 wt.-%, preferably in the range of 0.5 to 4.5 wt.-%, like in the range of 1.0 to 4.0 wt.-%.

However in preferred embodiments the polypropylene (PP1), in particular in case the polypropylene (PP1) is a propylene homopolymer (H-PP1), has a xylene cold soluble (XCS) content in the range of 0.5 to 5.0 wt.-%, more preferably in the range of 1.0 to 4.0 wt.-%, still more preferably of 1.5 to 3.5 wt.-%.

One further essential component of the first heterophasic propylene copolymer (HECO1) is its elastomeric propylene copolymer (E1).

The elastomeric propylene copolymer (E1) preferably comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the elastomeric propylene copolymer (E1) comprises, especially consists of, monomers copolymerizable with propylene from the group consisting of ethylene, 1-butene and 1-hexene. More specifically the elastomeric propylene copolymer (E1) comprises—apart from propylene—units derivable from ethylene and/or 1-butene. Thus in an especially preferred embodiment the elastomeric propylene copolymer phase (E1) comprises units derivable from ethylene and propylene only.

In case the polypropylene (PP1) is a propylene copolymer (R-PP1) it is preferred that the comonomer(s) of the propylene copolymer (R-PP1) and the elastomeric propylene copolymer (E1) are the same.

The properties of the elastomeric propylene copolymer phase (E1) mainly influence the xylene cold soluble (XCS) content of the first heterophasic propylene copolymer (HECO1). Thus according to the present invention the xylene cold soluble (XCS) fraction of the first heterophasic propylene copolymer (HECO1) is regarded as the elastomeric propylene copolymer (E1) of the first heterophasic propylene copolymer (HECO1).

Accordingly, the amount of the elastomeric propylene copolymer (E1), i.e. of the xylene cold soluble (XCS) fraction, of the first heterophasic propylene copolymer (HECO1) preferably is in the range of 24 to 38 wt.-%, more preferably in the range of 25 to 37 wt.-%, still more preferably in the range of 26 to 36 wt.-%. These values are based on the first heterophasic propylene copolymer (HECO1) and not on the total polyolefin composition.

One important requirement of the present invention is that the elastomeric propylene copolymer (E1) has a balanced weight average molecular weight. Small particles are formed in case the matrix and the elastomeric phase have similar molecular weight. Small particles are generally preferred, because this improves the overall properties of the heterophasic system. However, in the instant invention the matrix has by trend a high melt flow rate and thus a rather low weight average molecular weight. Accordingly also the elastomeric propylene copolymer (E1) should have a low weight average molecular weight in order to obtain small particles. On the other hand this would mean in the present case a severe reduction in low weight average molecular weight for the elastomeric propylene copolymer (E1), which has negative impact on the mechanical properties. Accordingly the intrinsic viscosity must be carefully chosen.

Low intrinsic viscosity (IV) values reflect a low weight average molecular weight. Thus it is appreciated that the elastomeric propylene copolymer phase (E1), i.e. the xylene cold soluble fraction (XCS) of the first heterophasic propylene copolymer (HECO1), has an intrinsic viscosity (IV) determined according to DIN ISO 1628/1 (in decaline at 135° C.) in the range of 2.0 to 3.5 dl/g, more preferably in the range of equal or more than 2.1 to 3.2 dl/g, still more preferably in the range of equal or more than 2.3 to 3.0 dl/g.

The comonomer content, preferably the ethylene content, within the elastomeric propylene copolymer phase (E1) shall be preferably also in a specific range. Accordingly in a preferred embodiment the comonomer content, more preferably ethylene content, of the elastomeric propylene copolymer (E1), i.e. of the xylene cold soluble fraction (XCS) of the first heterophasic propylene copolymer (HECO1), is in the range of 26 to 40 wt-%, still more preferably in the range of 28 to 38 wt-%, yet more preferably in the range of 31 to 38 wt-% Accordingly it is appreciated that the propylene content of the elastomeric propylene copolymer (E1), i.e. of the xylene cold soluble fraction (XCS) of the first heterophasic propylene copolymer (HECO1), is preferably in the range of 60 to 74 wt-%, still more preferably in the range of 62 to 72 wt-%, yet more preferably in the range of 62 to equal or less than 69 wt-%.

As will be explained below, the first heterophasic polypropylene (HECO1) as well its individual components (matrix and elastomeric copolymer) can be produced by blending different polymer types, i.e. of different molecular weight and/or comonomer content. However it is preferred that the first heterophasic polypropylene (HECO1) as well its individual components (matrix and elastomeric copolymer) are produced in a sequential step process, using reactors in serial configuration and operating at different reaction conditions. As a consequence, each fraction prepared in a specific reactor will have its own molecular weight distribution and/or comonomer content distribution.

The first heterophasic propylene copolymer (HECO1) according to this invention is preferably produced in a sequential polymerization process, i.e. in a multistage process, known in the art, wherein the polypropylene (PP1) is produced at least in one slurry reactor, preferably in a slurry reactor and optionally in a subsequent gas phase reactor, and subsequently the elastomeric propylene copolymer (E1) is produced at least in one, i.e. one or two, gas phase reactor(s).

Accordingly it is preferred that the first heterophasic propylene copolymer (HECO1) is produced in a sequential polymerization process comprising the steps of
(a) polymerizing propylene and optionally at least one ethylene and/or $C_4$ to $C_{12}$ α-olefin in a first reactor (R1) obtaining the first polypropylene fraction of the polypropylene (PP1), preferably said first polypropylene fraction is a first propylene homopolymer,
(b) transferring the first polypropylene fraction into a second reactor (R2),
(c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the polypropylene (PP1), i.e. the matrix of the heterophasic propylene copolymer (HECO1),
(d) transferring the polypropylene (PP1) of step (c) into a third reactor (R3),
(e) polymerizing in the third reactor (R3) and in the presence of the polypropylene (PP1) obtained in step (c) propylene and at least one ethylene and/or $C_4$ to $C_{12}$ α-olefin obtaining thereby a first elastomeric propylene copolymer fraction, the first elastomeric propylene copolymer fraction is dispersed in the polypropylene (PP1),
(f) transferring the polypropylene (PP1) in which the first elastomeric propylene copolymer fraction is dispersed in a fourth reactor (R4), and
(g) polymerizing in the fourth reactor (R4) and in the presence of the mixture obtained in step (e) propylene and at least one ethylene and/or $C_4$ to $C_{12}$ α-olefin obtaining thereby the second elastomeric propylene copolymer fraction, the polypropylene (PP1), the first elastomeric propylene copolymer fraction, and the second elastomeric propylene copolymer fraction form the heterophasic propylene copolymer (HECO1).

Of course, in the first reactor (R1) the second polypropylene fraction can be produced and in the second reactor (R2) the first polypropylene fraction can be obtained. The same holds true for the elastomeric propylene copolymer phase. Accordingly in the third reactor (R3) the second elastomeric propylene copolymer fraction can be produced whereas in the fourth reactor (R4) the first elastomeric propylene copolymer fraction is made.

Preferably between the second reactor (R2) and the third reactor (R3) and optionally between the third reactor (R3) and fourth reactor (R4) the monomers are flashed out.

The term "sequential polymerization process" indicates that the first heterophasic propylene copolymer (HECO1) is produced in at least two, like three or four reactors connected in series. Accordingly the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer.

According to the present invention the slurry reactor (SR) is preferably a (bulk) loop reactor (LR).

The second reactor (R2), the third reactor (R3) and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by *Borealis* A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the first heterophasic propylene copolymer (HECO1) is obtained by a multistage polymerization process, as described above, in the presence of a catalyst system comprising as component (i) a Ziegler-Natta procatalyst which contains a transesterification product of a lower alcohol and a phthalic ester.

The procatalyst used according to the invention for preparing the first heterophasic propylene copolymer (HECO1) is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

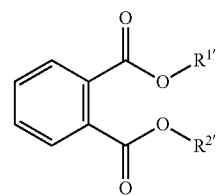

(I)

wherein R$^{1'}$ and R$^{2'}$ are independently at least a C$_5$ alkyl under conditions where a transesterification between said C$_1$ to C$_2$ alcohol and said dialkylphthalate of formula (I) takes place to form the internal donor
c) washing the product of stage b) or
d) optionally reacting the product of step c) with additional TiCl$_4$.

The procatalyst is produced as defined for example in the patent applications WO 87/07620, WO 92/19653, WO 92/19658 and EP 0 491 566. The content of these documents is herein included by reference.

First an adduct of MgCl$_2$ and a C$_1$-C$_2$ alcohol of the formula MgCl$_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula MgCl$_2$*nROH, wherein R is methyl or ethyl, preferably ethyl and n is 1 to 6, is contacting with TiCl$_4$ to form a titanized carrier, followed by the steps of adding to said titanised carrier
(i) a dialkylphthalate of formula (I) with R$^{1'}$ and R$^{2'}$ being independently at least a C$_5$-alkyl, like at least a C$_8$-alkyl,
or preferably
(ii) a dialkylphthalate of formula (I) with R$^{1'}$ and R$^{2'}$ being the same and being at least a C$_5$-alkyl, like at least a C$_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol-%, of a dialkylphthalate of formula (II)

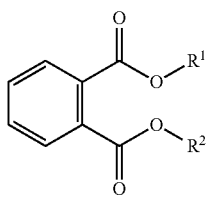

(II)

with R$^1$ and R$^2$ being methyl or ethyl, preferably ethyl, the dialkylphthalat of formula (II) being the internal donor and
recovering said transesterification product as the procatalyst composition (component (i)).

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic propylene copolymer (HECO1) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by

Si(OCH$_3$)$_2$R$_2^5$     (IIIa)

wherein R$^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R$^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

Si(OCH$_2$CH$_3$)$_3$(NR$^x$R$^y$)     (IIIb)

wherein R$^x$ and R$^y$ can be the same or different a represent a hydrocarbon group having 1 to 12 carbon atoms.

R$^x$ and R$^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^x$ and R$^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [Si(OCH$_3$)$_2$(cyclo-pentyl)$_2$] or diisopropyl dimethoxy silane [Si(OCH$_3$)$_2$(CH(CH$_3$)$_2$)$_2$].

Most preferably the external donor of formula (IIIb) is diethylaminotriethoxysilane.

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

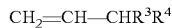

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

Accordingly it is appreciated that the first heterophasic propylene copolymer (HECO1) is α-nucleated. In case the α-nucleation is not effected by a vinylcycloalkane polymer or a vinylalkane polymer as indicated above, the following α-nucleating agents may be present
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and C$_1$-C$_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis(4,6,-di-tert-butylphenyl) phosphate or aluminium-hydroxy-bis[2,2'-methylene-bis(4,6-di-t-butylphenyl)phosphate], and
(iv) mixtures thereof.

Second Heterophasic Propylene Copolymer (HECO2)

As mentioned above, the polyolefin composition according to the present invention further comprises a second heterophasic propylene copolymer (HECO2) as an essential component.

The second heterophasic propylene copolymer (HECO2) typically has a lower melt flow rate MFR$_2$ than the first heterophasic propylene copolymer (HECO1). Furthermore, the intrinsic viscosity (IV) of the xylene cold soluble (XCS) fraction of the second heterophasic propylene copolymer (HECO2) should be significantly higher than in the first heterophasic propylene copolymer (HECO1).

Accordingly it is preferred that the ratio of the melt flow rate MFR$_2$ (230° C.) of the first heterophasic propylene copolymer (HECO1) to the second heterophasic propylene copolymer (HECO2) fulfills the in-equation (I), more preferably in-equation (Ia), still more preferably in-equation (Ib), yet more preferably in-equation (Ic)

$$\frac{MFR(1)}{MFR(2)} \geq 1.5, \tag{I}$$

$$1.5 \leq \frac{MFR(1)}{MFR(2)} \leq 20, \tag{Ia}$$

$$2.0 \leq \frac{MFR(1)}{MFR(2)} \leq 15, \tag{Ib}$$

$$2.0 \leq \frac{MFR(1)}{MFR(2)} \leq 10, \tag{Ic}$$

wherein
MFR (1) is the melt flow rate MFR$_2$ (230° C.) of the first heterophasic propylene copolymer (HECO1) and
MFR (2) is the melt flow rate MFR$_2$ (230° C.) of the second heterophasic propylene copolymer (HECO2).

In one further embodiment it is preferred that the ratio of the intrinsic viscosity (IV) of the cold xylene soluble content (XCS) of the second heterophasic propylene copolymer (HECO2) to the intrinsic viscosity (IV) of the cold xylene soluble content (XCS) of the first heterophasic propylene copolymer (HECO1) fulfills the in-equation (II), more preferably in-equation (IIa), still more preferably in-equation (IIb), yet more preferably in-equation (IIc)

$$\frac{IV(2)}{IV(1)} \geq 1.1, \tag{II}$$

$$1.1 \leq \frac{IV(2)}{IV(1)} \leq 4.0, \tag{IIa}$$

$$1.2 < \frac{IV(2)}{IV(1)} \leq 3.8, \tag{IIb}$$

$$1.3 \leq \frac{IV(2)}{IV(1)} \leq 3.5, \tag{IIc}$$

wherein
IV (1) is the intrinsic viscosity (IV) of the cold xylene soluble content (XCS) of the first heterophasic propylene copolymer (HECO1) and
IV (2) is the intrinsic viscosity (IV) of the cold xylene soluble content (XCS) of the second heterophasic propylene copolymer (HECO2).

The second heterophasic propylene copolymer (HECO2) of the present invention is a heterophasic system with balanced comonomer/intrinsic viscosity ratio in the xylene cold soluble (XCS) fraction of the same.

Accordingly the second heterophasic polypropylene composition (HECO2) of the present invention comprises a propylene homopolymer (H-PP2) and an elastomeric propylene copolymer (E2), wherein
(i) said propylene homopolymer (H-PP2) has a melt flow rate MFR$_2$ (230° C.) measured according to ISO 1133 in the range of above 15 to 400 g/10 min;
(ii) the xylene cold soluble (XCS) fraction of the second heterophasic propylene copolymer (HECO2) has an intrinsic viscosity determined according to DIN ISO 1628/1 (in decalin at 135° C.) in the range of more than 3.7 to 9.0 dl/g; and
(iii) the comonomer content of the xylene cold soluble (XCS) fraction of the second heterophasic propylene copolymer (HECO2) is in the range of 10.0 to 40.0 wt-%.

Preferably the second heterophasic propylene copolymer (HECO2) has a xylene cold soluble content (XCS) determined according ISO 16152 (25° C.) of below 40 wt.-%, preferably below 35 wt.-%, more preferably in the range of 8.0 to 35 wt.-%, yet more preferably in the range of 15 to 35 wt.-%, like in the range of 20 to 35 wt.-%.

In one preferred embodiment the second heterophasic propylene copolymer (HECO2) fulfills the in-equation (III)

$$0.50 \geq \left(0.241 \times \frac{c}{\text{wt.-\%}}\right) - \left(1.14 \times \frac{IV}{\text{dl/g}}\right) \quad \text{(III)}$$

wherein
C is the comonomer content in wt.-% of the xylene cold soluble (XCS) fraction of the second heterophasic propylene copolymer (HECO2), and
IV is the intrinsic viscosity in dl/g of the xylene cold soluble (XCS) fraction of the second heterophasic propylene copolymer (HECO2).

Preferably the second heterophasic propylene copolymer (HECO2) as defined above has a melt flow rate $MFR_2$ (230° C.) measured according to ISO 1133 in the range of 1.0 to 150 g/10 min, preferably in the range of 1.0 to 80 g/10 min, more preferably in the range of 2.0 to 50 g/10 min, like in the range of 3.0 to 20 g/10 min.

The second heterophasic propylene copolymer (HECO2) comprises a matrix (M2) being a propylene homopolymer (H-PP2) and dispersed therein the elastomeric propylene copolymer (E2). Thus the matrix (M2) contains (finely) dispersed inclusions being not part of the matrix (M2) and said inclusions contain the elastomeric propylene copolymer (E2). Concerning further definition of the term "heterophasic propylene copolymer" it is referred to the information provided above.

As mentioned above, the second heterophasic propylene copolymer (HECO2) comprises a propylene homopolymer (H-PP2). Said propylene homopolymer (H-PP2) constitutes the matrix (M2) of the second heterophasic propylene copolymer (HECO2).

As the propylene homopolymer (H-PP2) is nearly xylene cold insoluble and the elastomeric propylene copolymer (E2) is predominantly soluble in cold xylene, the properties of xylene cold insoluble fraction (XCI) of the second heterophasic propylene copolymer (HECO2) and of the propylene homopolymer (H-PP2) are quite similar.

Accordingly, the xylene cold insoluble (XCI) of the second heterophasic propylene copolymer (HECO2) and the propylene homopolymer (H-PP2) have a melt flow rate $MFR_2$ (230° C.) measured according to ISO 1133 in the range of 15 to 400 g/10 min, preferably in the range 20 to 300 g/10 min, more preferably in the range of 30 to 120 g/10 min, yet more preferably in the range of 45 to 95 g/10 min.

The propylene homopolymer (H-PP2) can be monomodal or multimodal, like bimodal, in its molecular weight fraction.

In case the propylene homopolymer (H-PP2) is multimodal, like bimodal, in its molecular weight, it comprises at least two fractions, preferably consist of two fractions, the fractions are a first propylene homopolymer fraction (H-PP2a) and a second propylene homopolymer fraction (H-PP2b). Preferably the two fractions differ in the melt flow rate $MFR_2$ (230° C.). Accordingly it is appreciated that the first propylene homopolymer fraction (H-PP2a) differs by a melt flow rate $MFR_2$ (230° C.) of at least 10 g/10 min, more preferably by at least 20 g/10 min, still more preferably in a range from 10 to 200 g/10 min, yet more preferably in a range from 20 to 150 g/10 min, from the second propylene homopolymer fraction (H-PP2b). Preferably the melt flow rate $MFR_2$ (230° C.) of the first propylene homopolymer fraction (H-PP2a) is higher than the melt flow rate $MFR_2$ (230° C.) of the second propylene homopolymer fraction (H-PP2b).

The elastomeric propylene copolymer (E2) of the second heterophasic propylene copolymer (HECO2) mainly influences the properties and amount of the xylene cold soluble (XCS) fraction of the second heterophasic propylene copolymer (HECO2). Accordingly in a first approximation the properties of the elastomeric propylene copolymer (E2) can be equated with the properties of the xylene cold soluble (XCS) fraction of the second heterophasic propylene copolymer (HECO2). However in preferred embodiments the amount of elastomeric propylene copolymer (E2) is higher than the total xylene cold soluble (XCS) content of the second heterophasic propylene copolymer (HECO2).

Accordingly the amount of elastomeric copolymer (E2) of the second heterophasic propylene copolymer (HECO2) preferably is below 40.0 wt.-%, more preferably equal or below 38.0 wt.-%, still more preferably in the range of 15.0 to 40 wt.-%, yet more preferably in the range of 17.0 to below 38 wt.-%.

On the other hand, the amount of the xylene cold soluble (XCS) fraction of the second heterophasic propylene copolymer (HECO2) preferably is below 40.0 wt.-%, more preferably equal or below 35.0 wt.-%, still more preferably in the range of 8.0 to 35.0 wt.-%, yet more preferably in the range of 15.0 to 35.0 wt.-%, like in the range of 20.0 to 35.0 wt.-%.

The elastomeric propylene copolymer (E2) comprises monomers copolymerizable with propylene, for example comonomers such as ethylene and/or $C_4$ to $C_{12}$ α-olefins, in particular ethylene and/or $C_4$ to $C_{12}$ α-olefins, e.g. 1-butene and/or 1-hexene. Preferably the elastomeric propylene copolymer (E2) comprises, especially consists of, monomers copolymerizable with propylene from the group consisting of ethylene, 1-butene and 1-hexene. More specifically the elastomeric propylene copolymer (E2) comprises—apart from propylene—units derivable from ethylene and/or 1-butene. Thus in an especially preferred embodiment the elastomeric propylene copolymer phase (E2) comprises units derivable from ethylene and propylene only, i.e. is a propylene-ethylene rubber (EPR).

The comonomer content, preferably the ethylene content, of the elastomeric propylene copolymer (E2) based on the total weight of the elastomeric propylene copolymer (E2) preferably is not more than 40.0 wt-%, still more preferably not more than 35.0 wt-%, yet more preferably in the range of 10.0 to 40.0 wt %, still yet more preferably in the range of 12.0 to 35.0 wt-%, even yet more preferably in the range of 14.0 to 30.0 wt-%.

In turn it is preferred that the comonomer content, preferably the ethylene content, of the xylene cold soluble (XCS) fraction of the second heterophasic propylene copolymer (HECO2) is not more than 40.0 wt-%, still more preferably not more than 35.0 wt-%, yet more preferably in the range of 10.0 to 40.0 wt-%, still yet more preferably in the range of 12.0 to 30.0 wt-%, even yet more preferably in the range of 13.0 to 28.0 wt-%, like in the range of 14.0 to 25.0 wt-%.

Additionally it is required that the molecular weight of the xylene cold soluble (XCS) fraction of the second heterophasic propylene copolymer (HECO2) is in a specific range. Accordingly it is appreciated that the xylene cold soluble (XCS) fraction of the second heterophasic propylene copolymer (HECO2) has an intrinsic viscosity (IV) determined according to DIN ISO 1628/1 (in decalin at 135° C.) in the range of more than 3.7 to 9.0 dl/g, more preferably in the range of 4.0 to 8.5 dl/g, still more preferably in the range of 4.2 to 8.0 dug, like in the range of 4.5 to 7.0 dl/g.

An essential aspect of the present invention is that the intrinsic viscosity (IV) and the comonomer content, preferably the ethylene content, of the xylene cold soluble fraction of the second heterophasic propylene copolymer (HECO2) are aligned to each other. Accordingly it is required that the second heterophasic propylene copolymer (HECO2) fulfills the inequation (III), preferably inequation (IIIa), more preferably inequation (IIIb), still more preferably inequation (IIIc), $$0.50 \geq \left(0.241 \times \frac{c}{wt.-\%}\right) - \left(1.14 \times \frac{IV}{dl/g}\right) \quad \text{(III)}$$

$$0.30 \geq \left(0.241 \times \frac{c}{wt.-\%}\right) - \left(1.14 \times \frac{IV}{dl/g}\right) \quad \text{(IIIa)}$$

$$0.00 \geq \left(0.241 \times \frac{c}{wt.-\%}\right) - \left(1.14 \times \frac{IV}{dl/g}\right) \quad \text{(IIIb)}$$

$$-0.50 \geq \left(0.241 \times \frac{c}{wt.-\%}\right) - \left(1.14 \times \frac{IV}{dl/g}\right) \quad \text{(IIIc)}$$

wherein

C is the comonomer content in wt.-% of the xylene cold soluble (XCS) fraction of the second heterophasic propylene copolymer (HECO2), and IV is the intrinsic viscosity in dl/g of the xylene cold soluble (XCS) fraction of the second heterophasic propylene copolymer (HECO2).

As can be taken from the above inequations, the values of the comonomer content and the intrinsic viscosity are used dimensionless as they are divided by the respective unit, i.e. by "wt.-%" and "dl/g", respectively.

As mentioned above the second heterophasic propylene copolymer (HECO2) comprises the propylene homopolymer (H-PP2) and the elastomeric propylene copolymer (E2).

Accordingly the comonomers of the second heterophasic propylene copolymer (HECO2) are preferably the same as for the elastomeric propylene copolymer (E2). Thus, the second heterophasic propylene copolymer (HECO2) comprises apart from propylene comonomers such as ethylene and/or $C_4$ to $C_{12}$ α-olefins, in particular ethylene and/or $C_4$ to $C_{10}$ α-olefins, e.g. 1-butene and/or 1-hexene. Preferably the second heterophasic propylene copolymer (HECO2) comprises, especially consists of, monomers copolymerizable with propylene from the group consisting of ethylene, 1-butene and 1-hexene. More specifically the second heterophasic propylene copolymer (HECO2) comprises—apart from propylene—units derivable from ethylene and/or 1-butene. Thus in an especially preferred embodiment the second heterophasic propylene copolymer (HECO2) comprises units derivable from ethylene and propylene only.

The comonomer content, preferably the ethylene content, of the second heterophasic propylene copolymer (HECO2) preferably is below 20.0 wt-%, more preferably not more than 16.0 wt-%, still more preferably in the range of 3.5 to 16.0 wt-%, yet more preferably in the range of more than 4.0 to 14.0 wt-%.

Preferably it is desired that the second heterophasic propylene copolymer (HECO2) is thermo mechanically stable. Accordingly it is appreciated that the second heterophasic propylene copolymer (HECO2) has a melting temperature ($T_m$) of at least 135° C., more preferably in the range of 135 to 168° C.

The second heterophasic propylene copolymer (HECO2) as defined in the instant invention may contain up to 5.0 wt.-% additives (excluding α-nucleating agents), like antioxidants and slip agents as well as antiblocking agents. Preferably the additive content is below 3.0 wt.-%, like below 1.0 wt.-%.

Preferably the second heterophasic propylene copolymer (HECO2) comprises an α-nucleating agent. Even more preferred the present invention is free of β-nucleating agents. Accordingly, the α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis(4, 6,-di-tert-butylphenyl) phosphate or aluminium-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", 5th edition, 2001 of Hans Zweifel, pages 871 to 873.

Preferably the second heterophasic propylene copolymer (HECO2) contains up to 5 wt.-% of the α-nucleating agent. In a preferred embodiment, the second heterophasic propylene copolymer (HECO2) contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(m-ethylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

It is especially preferred the second heterophasic propylene copolymer (HECO2) contains a vinylcycloalkane, like vinylcyclohexane (VCH), polymer and/or vinylalkane polymer. In one specific embodiment the second heterophasic propylene copolymer (HECO2) contains a vinylcycloalkane, like vinylcyclohexane (VCH), polymer and/or vinylalkane polymer. Preferably the vinylcycloalkane is vinylcyclohexane (VCH) polymer is introduced into the second heterophasic propylene copolymer (HECO2) by the BNT technology.

The second heterophasic propylene copolymer (HECO2) is preferably obtained by a specific process. Accordingly the second heterophasic propylene copolymer (HECO2) is preferably obtained by a sequential polymerization process in the first reactor ($1^{st}$ R') and optionally in a second reactor ($2^{nd}$ R') the propylene homopolymer (H-PP2) is produced, whereas in the third reactor ($3^{rd}$ R') and optionally in a fourth reactor ($4^{th}$ R') the elastomeric propylene copolymer (E2) of the second heterophasic propylene copolymer (HECO2) is obtained.

The term "sequential polymerization process" indicates that the second heterophasic propylene copolymer (HECO2) is produced in at least two reactors, preferably in three or four reactors, connected in series. Accordingly the present process comprises at least a first reactor ($1^{st}$ R'), an optional second reactor ($2^{nd}$ R'), a third reactor ($3^{rd}$ R') and optional a fourth reactor ($4^{th}$ R') The term "polymerization reactor" shall indicate that the main polymerization takes place. Thus in case the process consists of three or four polymerization reactors, this definition does not exclude the option that the overall process comprises for instance a pre-polymerization step in a pre-polymerization reactor. The term "consist of" is only a closing formulation in view of the main polymerization reactors.

As stated above in the first ($1^{st}$ R') or in the first two reactors ($1^{st}$ and $2^{nd}$ R') the matrix (M2), i.e. the propylene homopolymer (H-PP2) is produced. In case two reactors are used for the preparation of the propylene homopolymer (H-PP2), in each reactor a propylene homopolymer fraction (H-PP2a) and (H-PP2b) is produced which may differ in the melt flow rate as indicated above. Preferably the first propylene homopolymer fraction (H-PP2a) is produced in the first reactor ($1^{st}$ R') whereas the second propylene homopolymer fraction (H-PP2b) is produced in the second reactor ($2^{nd}$ R').

Preferably the weight ratio between the first propylene homopolymer fraction (H-PP2a) and second propylene homopolymer fraction (H-PP2b) is 20/80 to 80/20, more preferably 30/70 to 70/30, yet more preferably 40/60 to 65/35.

After the first reactor ($1^{st}$ R') or optional second reactor ($2^{nd}$ R') the matrix (M2), i.e. the propylene homopolymer (H-PP2), of the second heterophasic propylene copolymer (HECO2), is obtained. This matrix (M2) is subsequently transferred into the third reactor ($3^{rd}$ R') and optional fourth reactor ($4^{th}$ R') in which the elastomeric propylene copolymer (E2) is produced and thus the second heterophasic propylene copolymer (HECO2) of the instant invention is obtained.

Preferably the weight ratio between the matrix (M2), i.e. the propylene homopolymer (H-PP2), and the elastomeric propylene copolymer (E2) [(M2)/(E2)] is 91/9 to 60/40, more preferably 90/10 to below 70/30.

The first reactor ($1^{st}$ R') is preferably a slurry reactor (SR) and can be any continuous or simple stirred batch tank reactor or loop reactor operating in bulk or slurry. Bulk means a polymerization in a reaction medium that comprises of at least 60% (w/w) monomer.

According to the present invention the slurry reactor (SR) is preferably a (bulk) loop reactor (LR).

The second reactor ($2^{nd}$ R'), the third reactor ($3^{th}$ R') and fourth reactor ($4^{th}$ R') are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor ($1^{st}$ R') is a slurry reactor (SR), like loop reactor (LR), whereas the second reactor ($2^{nd}$ R'), the third reactor ($3^{th}$ R') and the optional fourth reactor ($4^{th}$ R') are gas phase reactors (GPR). Accordingly for the instant process at least two, preferably two or three polymerization reactors, namely a slurry reactor (SR), like loop reactor (LR), a first gas phase reactor (GPR-1), a second gas phase reactor (GPR-2) and optionally a thrid gas phase reactor (GPR-3) connected in series are used. If needed prior to the slurry reactor (SR) a prepolymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the second heterophasic propylene copolymer (HECO2), as defined above the conditions for the first reactor ($1^{st}$ R'), i.e. the slurry reactor (SR), like a loop reactor (LR), may be as follows:

the temperature is within the range of 40° C. to 110° C., preferably between 60° C. and 100° C., like 68 to 95° C., the pressure is within the range of 20 bar to 80 bar, preferably between 40 bar to 70 bar, hydrogen can be added for controlling the molar mass in a manner known per se.

Subsequently, the reaction mixture from the first reactor ($1^{st}$ R') is transferred to the second reactor ($2^{nd}$ R'), i.e. gas phase reactor (GPR-1), whereby the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor ($3^{rd}$ R') and the fourth reactor ($4^{th}$ R'), preferably in the second gas phase reactor (GPR-2) and thrid gas phase reactor (GPR-3), are similar to the second reactor ($2^{nd}$ R').

The residence time can vary in the three or four reactor zones.

In one embodiment of the process for producing the second heterophasic propylene copolymer (HECO2), the residence time the first reactor ($1^{st}$ R'), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor ($1^{st}$ R'), i.e. in the slurry reactor (SR), like in the loop reactor (LR), and/or as a condensed mode in the gas phase reactors (GPR).

Preferably the process comprises also a prepolymerization with the catalyst system, as mentioned below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the second heterophasic propylene copolymer (HECO2) is obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIIa) or (IIIb), preferably represented by formula (IIIa), as described above in accordance with the preparation of the first heterophasic propylene copolymer (HECO1).

More preferably the external donor is of formula (IIIa), like dicyclopentyl dimethoxy silane [$Si(OCH_3)_2(cyclo-pentyl)_2$] or diisopropyl dimethoxy silane [$Si(OCH_3)_2(CH(CH_3)_2)_2$].

The additives as stated above are added to the second heterophasic propylene copolymer (HECO2) preferably by extruding. For mixing/extruding, a conventional compounding or blending apparatus, e.g. a Banbury mixer, a 2-roll rubber mill, Buss-co-kneader or a twin screw extruder may be used. The polymer materials recovered from the extruder are usually in the form of pellets.

Polyolefin Composition and its Use

The first heterophasic propylene copolymer (HECO1) and the second heterophasic propylene copolymer (HECO2) are combined to form the inventive polyolefin composition. Blending can be achieved in any conventional manner such as e.g. in an extruder.

In order to obtain the desired properties, the heterophasic propylene copolymers are preferably blended in a specific mixing ratio. Thus, inventive polyolefin composition preferably comprises the first heterophasic propylene copolymer (HECO1) and the second heterophasic propylene copolymer (HECO2) in a weight ratio [(HECO1):(HECO2)] of 1.2:1 to 15:1, more preferably of 1.3:1 to 10:1, still more preferably in the range of 1.4.1 to 8:1. The inventive polyolefin composition may comprise further polymers, however it is preferred that the two heterophasic propylene copolymers (HECO1) and (HECO2) constitute the main amount of the composition. Therefore it is preferred that the two heterophasic propylene copolymers (HECO1) and (HECO2) make up at least 50 wt.-%, more preferably at least 70 wt.-%, still more preferably at least 80 wt.-%, of the inventive polyolefin composition. The remaining part may be additives, fillers, polymers used as carrier for the additives or elastomers.

The polyolefin composition of the present invention is preferably used for the production of automotive articles, like moulded automotive articles, preferably automotive injection moulded articles. Even more preferred is the use for the production of car interiors and exteriors, like bumpers, side trims, step assists, body panels, spoilers, dashboards, interior trims and the like.

The current invention also provides (automotive) articles, like injection molded articles, comprising at least to 60 wt.-%, more preferably at least 80 wt.-%, yet more preferably at least 95 wt.-%, like consisting, of the inventive polyolefin composition. Accordingly the present invention is especially directed to automotive articles, especially to car interiors and exteriors, like bumpers, side trims, step assists, body panels, spoilers, dashboards, interior trims and the like, comprising at least to 60 wt.-%, more preferably at least 80 wt.-%, yet more preferably at least 95 wt.-%, like consisting, of the inventive polyolefin composition.

The present invention will now be described in further detail by the examples provided below.

EXAMPLES

1. Definitions/Measuring Methods

The following definitions of terms and determination methods apply for the above general description of the invention as well as to the below examples unless otherwise defined.

Calculation of comonomer content of the second fraction of the propylene copolymer (R-PP2) of the first heterophasic propylene copolymer (HECO1):

$$\frac{C(PP) - w(PP1) \times C(PP1)}{w(PP2)} = C(PP2)$$

wherein w(PP1) is the weight fraction [in wt.-%] of the first fraction of the propylene copolymer (R-PP1), w(PP2) is the weight fraction [in wt.-%] of second fraction of the propylene copolymer (R-PP2), C(PP1) is the comonomer content [in wt-%] of the first fraction of the propylene copolymer (R-PP1), C(PP) is the comonomer content [in wt.-%] of the propylene copolymer (R-PP), C(PP2) is the calculated comonomer content [in wt-%] of the second fraction of the propylene copolymer (R-PP2).

Calculation of the xylene cold soluble (XCS) content of the second fraction of the propylene copolymer (R-PP2) of the first heterophasic propylene copolymer (HECO1):

$$\frac{XS(PP) - w(PP1) \times XS(PP1)}{w(PP2)} = XS(PP2)$$

wherein w(PP1) is the weight fraction [in wt.-%] of the first fraction of the propylene copolymer (R-PP1), w(PP2) is the weight fraction [in wt.-%] of second fraction of the propylene copolymer (R-PP2), XS(PP1) is the xylene cold soluble (XCS) content [in wt.-%] of the first fraction of the propylene copolymer (R-PP1), XS(PP) is the xylene cold soluble (XCS) content [in wt.-%] of the propylene copolymer (R-PP), XS(PP2) is the calculated xylene cold soluble (XCS) content [in wt.-%] of the second fraction of the propylene copolymer (R-PP2).

Calculation of melt flow rate MFR$_2$ (230° C.) of the second fraction of the propylene copolymer (R-PP2) of the first heterophasic propylene copolymer (HECO1):

$$MFR(PP2) = 10^{\left[\frac{\log(MFR(PP))-w(PP1)\times\log(MFR(PP1))}{w(PP2)}\right]}$$

wherein
w(PP1) is the weight fraction [in wt.-%] of the first fraction of the propylene copolymer (R-PP1),
w(PP2) is the weight fraction [in wt.-%] of second fraction of the propylene copolymer (R-PP2),
MFR(PP1) is the melt flow rate MFR$_2$ (230° C.) [in g/10 min] of the first fraction of the propylene copolymer (R-PP1),
MFR(PP) is the melt flow rate MFR$_2$ (230° C.) [in g/10 min] of the propylene copolymer (R-PP),
MFR(PP2) is the calculated melt flow rate MFR$_2$ (230° C.) [in g/10 min] of the second fraction of the propylene copolymer (R-PP2).

Calculation of melt flow rate MFR$_2$ (230° C.) of the second fraction of the propylene copolymer (H-PP2b) of the second heterophasic propylene copolymer (HECO2):

$$MFR(PP2) = 10^{\left[\frac{\log(MFR(PP))-w(PP1)\times\log(MFR(PP1))}{w(PP2)}\right]}$$

wherein
w(PP1) is the weight fraction [in wt.-%] of the first fraction of the propylene copolymer (H-PP2), i.e. of the first propylene homopolymer fraction (H-PP2a),
w(PP2) is the weight fraction [in wt.-%] of the second fraction of the propylene copolymer (H-PP2), i.e. of the second propylene homopolymer fraction (H-PP2b),
MFR(PP1) is the melt flow rate MFR$_2$ (230° C.) [in g/10 min] of the first fraction of the propylene copolymer (H-PP2), i.e. of the first propylene homopolymer fraction (H-PP2a),
MFR(PP) is the melt flow rate MFR$_2$ (230° C.) [in g/10 min] of the propylene homopolymer (H-PP2),
MFR(PP2) is the calculated melt flow rate MFR$_2$ (230° C.) [in g/10 min] of the second fraction of the propylene copolymer (H-PP2), i.e. of the second propylene homopolymer fraction (H-PP2b).

Calculation of comonomer content of the elastomeric propylene copolymer (E) of the first heterophasic propylene copolymer (HECO1):

$$\frac{C(HECO) - w(PP) \times C(PP)}{w(E)} = C(E) \quad \text{(IV)}$$

wherein
w(PP) is the weight fraction [in wt.-%] of the propylene copolymer (R-PP), i.e. polymer produced in the first and second reactor (R1+R2),
w(E) is the weight fraction [in wt.-%] of the elastomeric propylene copolymer (E), i.e. polymer produced in the third and fourth reactor (R3+R4)
C(PP) is the comonomer content [in wt-%] of the propylene copolymer (R-PP), i.e. comonomer content [in wt.-%] of the polymer produced in the first and second reactor (R1+R2),
C(HECO) is the comonomer content [in wt-%] of the propylene copolymer, i.e. is the comonomer content [in wt.-%] of the polymer obtained after polymerization in the fourth reactor (R4),
C(E) is the calculated comonomer content [in wt.-%] of elastomeric propylene copolymer (E), i.e. is the comonomer content [in wt-%] of the polymer produced in the third and fourth reactor (R3+R4).

Quantification of Microstructure by NMR Spectroscopy

Quantitative nuclear-magnetic resonance (NMR) spectroscopy was used to quantify the comonomer content of the polymers. Quantitative $^{13}\text{C}\{^1\text{H}\}$ NMR spectra were recorded in the solution-state using a Bruker Advance III 400 NMR spectrometer operating at 400.15 and 100.62 MHz for $^1$H and $^{13}$C respectively. All spectra were recorded using a $^{13}$C optimised 10 mm extended temperature probehead at 125° C. using nitrogen gas for all pneumatics. Approximately 200 mg of material was dissolved in 3 ml of 1,2-tetrachloroethane-d$_2$ (TCE-d$_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}\text{C}\{^1\text{H}\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W.-J., Zhu, S., Macromolecules 33 (2000), 1157) through integration of multiple signals across the whole spectral region in the $^{13}\text{C}\{^1\text{H}\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

DSC analysis, melting temperature ($T_m$) and heat of fusion ($H_f$), crystallization temperature ($T_c$) and heat of crystallization ($H_c$): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_c$) are determined from the cooling step, while melting temperature and heat of fusion ($H_f$) are determined from the second heating step.

$MFR_2$ (230° C.) is measured according to ISO 1133 (230° C., 2.16 kg load).

The xylene cold solubles (XCS, wt.-%): Content of xylene cold solubles (XCS) is determined at 25° C. according ISO 16152; first edition; 2005-07-01 Intrinsic viscosity is measured according to DIN ISO 1628/1, October 1999 (in Decalin at 135° C.).

Tensile Modulus; Tensile strain at break are measured according to ISO 527-2 (cross head speed=1 mm/min; 23° C.) using injection molded specimens as described in EN ISO 1873-2 (dog bone shape, 4 mm thickness).

Charpy impact test: The Charpy notched impact strength (Charpy NIS) is measured according to ISO 179 2C/DIN 53453 at 23° C. and −20° C., using injection molded bar test specimens of 80×10×4 $mm^3$ $mm^3$ prepared in accordance with ISO 294-1:1996.

2. Examples

The catalyst used in the polymerization processes has been produced as follows: First, 0.1 mol of $MgCl_2×3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. The catalyst was prepolymerized with vinyl cyclohexane in an amount to achieve a concentration of 200 ppm poly(vinyl cyclohexane) (PVCH) in the final polymer (see EP 1183307 A1). As co-catalyst triethyl-aluminium (TEAL) and as donor dicyclo pentyl dimethoxy silane (D-donor) (HECO2a and Heco 2b) and diethylaminotriethoxysilane [U-Donor] (HECO1), respectively, were used. The aluminium to donor ratio is indicated in table 1.

TABLE 1

Preparation of heterophasic propylene copolymers (HECO)

| Parameter | unit | HECO 1 | HECO 2a | HECO 2b |
|---|---|---|---|---|
| Prepolymerisation | | | | |
| temperature | [° C.] | 30 | 30 | 30 |
| pressure | [bar] | 56 | 55 | 56 |
| Al/donor ratio | [mol/mol] | 5.1 | 8.2 | 10.3 |
| residence time | [h] | 0.25 | 0.29 | 0.26 |
| Loop | | | | |
| temperature | [° C.] | 72 | 72 | 76 |
| pressure | [bar] | 56 | 55 | 56 |
| residence time | [h] | 0.22 | 0.42 | 0.8 |
| ethylene feed | [kg/h] | 0 | 0 | 0 |
| H2/C3 ratio | [mol/kmol] | 26.9 | 20.3 | 24.7 |
| C2 | [wt-%] | 0 | 0 | 0 |
| XCS | [wt.-%] | 3.4 | 2.3 | 2.1 |
| MFR | [g/10 min] | 294 | 97 | 160 |
| Split | [wt.-%] | 37.6 | 28.4 | 47.5 |
| GPR1 | | | | |
| temperature | [° C.] | 87 | 87 | 80 |
| pressure | [bar] | 22 | 22 | 24 |
| residence time | [h] | 0.34 | 0.39 | 1 |
| ethylene feed | [kg/h] | 0 | 0 | 0 |
| H2/C3 ratio | [mol/kmol] | 121.1 | 184.4 | 44.8 |
| C2 | [wt-%] | 0 | 0 | 0 |
| XCS | [wt.-%] | 3.1 | 2.0 | 2.0 |
| MFR | [g/10 min] | 230 | 85 | 55 |
| Split | [wt.-%] | 34.8 | 26.3 | 31.7 |
| GPR2 | | | | |
| temperature | [° C.] | 82 | 65 | 67 |
| pressure | [bar] | 22 | 21 | 21 |
| residence time | [h] | 0.13 | 0.43 | |
| H2/C3 ratio | [mol/kmol] | 22.0 | 22.0 | 22.8 |
| C2/C3 ratio | [mol/kmol] | 305 | 324 | 242 |
| C2 | [wt %] | 9.7 | 9.2 | 7 |
| XCS | [wt.-%] | 21.6 | 20.5 | 18 |
| MFR | [g/10 min] | 67 | 16.4 | 20 |
| Split | [wt.-%] | 18.5 | 17.8 | 11.7 |
| GPR3 | | | | |
| temperature | [° C.] | 85 | 70 | 67 |
| pressure | [bar] | 22 | 19 | 15 |
| residence time | [h] | 0.58 | 0.59 | |
| H2/C2 ratio | [mol/kmol] | 71.8 | 22.0 | 22.4 |
| C2/C3 ratio | [mol/kmol] | 305 | 326 | 250 |
| Split | [wt.-%] | 9.1 | 27.5 | 9.1 | n.d. not determined

TABLE 2

The heterophasic polypropylenes (HECO)

|  |  | HECO 1 | HECO 2a | HECO 2b |
|---|---|---|---|---|
| MFR of Matrix | [g/10 min] | 230 | 85 | 55 |
| XCS of Matrix | [wt %] | 3.1 | 2.0 | 2.0 |
| C2 of Matrix | [wt-%] | 0 | 0 | 0 |
| MFR | [g/10 min] | 34 | 3.6 | 4.2 |
| XCS | [wt %] | 29 | 34.2 | 25 |
| C2 total | [wt %] | 13.7 | 12.6 | 7.6 |
| C2 in XCS | [wt %] | 37.5 | 25.0 | 20.8 |
| IV of XCS | [dl/g] | 2.7 | 5.9 | 6.3 | n.d. not determined

Polyolefin compositions according to the present invention were produced by melt blending two heterophasic propylene copolymers.

TABLE 3

Properties of the inventive examples and comparative examples

|  |  | Example | | | | | | | |
|---|---|---|---|---|---|---|---|---|---|
|  |  | CE 1 | CE 2 | CE3 | IE 1 | IE2 | IE3 | IE4 | IE5 |
| HECO 1 | [wt %] | 100 | — | — | 80 | 60 | 85 | 70 | 60 |
| HECO 2a | [wt %] | — | 100 | — | 20 | 40 | — | — | — |
| HECO 2b | [wt %] | — | — | 100 | — | — | 15 | 30 | 40 |
| MFR | [g/10 min] | 33 | 7.0 | 4.1 | 20 | 15 | 25 | 17 | 14 |
| Tensile Modulus | [MPa] | 1107 | 852 | 1088 | 1041 | 989 | 1054 | 1060 | 1055 |
| Tensile strain at break | [%] | 16 | 261 | 504 | 47 | 206 | 172 | 348 | 350 |
| Impact strength +23° C. | [kJ/m²] | 11.9 | 61 | 47.7 | 23 | 33 | 52 | 52 | 53 |
| Impact strength −20° C. | [kJ/m²] | 6.4 | 12.1 | 6.3 | 10 | 12 | 8 | 7.4 | 7.4 |

The characterization of the base polymers are summarized in Table 2. The properties of the inventive and comparative examples are summarized in Table 3. CE1 relates to a first heterophasic propylene copolymer (HECO1), CE2 relates to a second heterophasic propylene copolymer (HECO2a) and CE3 relates to the other second heterophasic propylene copolymer (HECO2b). The results described in table 3 show an improvement in the balance of flowability, toughness, stiffness, impact and strain at break.

The invention claimed is:

1. A polyolefin composition comprising
    (a) a first heterophasic propylene copolymer (HECO1) having
        (i) a melt flow rate MFR$_2$ (230° C.) measured according to ISO 1133 in the range of 15.0 to 55.0 g/10min, and
        (ii) a xylene cold soluble content (XCS) determined according ISO 16152 (25° C.) in the range of 24 to 38 wt.-%, wherein further
        (iii) the intrinsic viscosity (IV) determined according to DIN ISO 1628/1 (in decalin at 135° C.) of the xylene cold soluble (XCS) fraction of the heterophasic propylene copolymer (HECO1) is in the range of 2.0 to 3.5 dl/g, and
    (b) a second heterophasic propylene copolymer (HECO2) comprising a propylene homopolymer (H-PP2) and an elastomeric propylene copolymer (E2), wherein
        (i) the propylene homopolymer (H-PP2) has a melt flow rate MFR$_2$ (230° C.) measured according to ISO 1133 in the range of above 15 to 400 g/10min;
        (ii) the xylene cold soluble (XCS) fraction of the second heterophasic propylene copolymer (HECO2) has an intrinsic viscosity determined according to DIN ISO 1628/1 (in decalin at 135° C.) in the range of more than 3.7 to 9.0 dl/g; and
        (iii) the comonomer content of the xylene cold soluble (XCS) fraction of the second heterophasic propylene copolymer (HECO2) is in the range of 10.0 to 40.0 wt.-%.

2. The polyolefin composition according to claim 1, wherein the second heterophasic propylene copolymer (HECO2) has
    (a) a xylene cold soluble content (XCS) determined according ISO 16152 (25° C.) of below 40 wt.-%, and/or
    (b) a melt flow rate MFR$_2$ (230° C.) measured according to ISO 1133 in the range of 1.0 to 150 g/10min.

3. The polyolefin composition according to claim 1, wherein the second heterophasic propylene copolymer (HECO2) fulfills the in-equation (IV)

$$0.50 \geq \left(0.241 \times \frac{c}{\text{wt.-\%}}\right) - \left(1.14 \times \frac{IV}{\text{dl/g}}\right) \quad (IV)$$

wherein
C is the comonomer content in wt.-% of the xylene cold soluble (XCS) fraction of the second heterophasic propylene copolymer (HECO2), and
IV is the intrinsic viscosity in dl/g of the xylene cold soluble (XCS) fraction of the second heterophasic propylene copolymer (HECO2).

4. The polyolefin composition according to claim 1, wherein
    (i) the first heterophasic propylene copolymer (HECO1) has a comonomer content in the range of 6.0 to 17.0 wt.-%, and/or
    (ii) the comonomer content of the xylene cold soluble (XCS) fraction of the first heterophasic propylene copolymer (HECO1) is in the range of 26 to 40 wt.-%.

5. The polyolefin composition according to claim 1, wherein the second heterophasic propylene copolymer (HECO2) has a comonomer content below 20.0 wt.-%.

6. The polyolefin composition according to claim 1, wherein the first heterophasic propylene copolymer (HECO1) comprises a polypropylene (PP 1) as matrix and an elastomeric propylene copolymer (E1) dispersed in the matrix.

7. The polyolefin composition according to claim 1, wherein
    (i) the polyolefin composition comprises the first heterophasic propylene copolymer (HECO1) and the second heterophasic propylene copolymer (HECO2) in a weight ratio [(HECO1):(HECO2)] of 1.2:1 to 15:1, and/or (ii) the two heterophasic propylene copolymers (HECO1) and (HECO2) make up at least 50 wt.-%, preferably at least 70 wt.-%, of the polyolefin composition.

8. An automotive article comprising at least to 60 wt.-% of the polyolefin composition according to claim 1.

9. The automotive article according to claim 8, wherein the automotive article is selected from the group consisting of bumpers, side trims, step assists, body panels, spoilers, dashboards, and interior trims.

10. The polyolefin composition according to claim 2, wherein the second heterophasic propylene copolymer (HECO2) has
  (a) a xylene cold soluble content (XCS) determined according ISO 16152 (25° C.) of 8.0 to 35 wt.-%, and/or
  (b) a melt flow rate MFR$_2$ (230° C.) measured according to ISO 1133 in the range of 1.0 to 150 g/10min.

11. The polyolefin composition according to claim 6, wherein
  (i) the polypropylene (PP1) is a propylene homopolymer (H-PP1), and/or
  (ii) the polypropylene (PP1) has a melt flow rate MFR$_2$ (230° C.) measured according to ISO 1133 of 60 to 400 g/10min.

12. The polyolefin composition according to claim 2, wherein the second heterophasic propylene copolymer (HECO2) fulfills the in-equation (IV)

$$0.50 \geq \left(0.241 \times \frac{C}{\text{wt.-\%}}\right) - \left(1.14 \times \frac{IV}{\text{dl/g}}\right) \quad \text{(IV)}$$

wherein
  C is the comonomer content in wt.-% of the xylene cold soluble (XCS) fraction of the second heterophasic propylene copolymer (HECO2), and
  IV is the intrinsic viscosity in dl/g of the xylene cold soluble (XCS) fraction of the second heterophasic propylene copolymer (HECO2).

13. The polyolefin composition according to claim 2, wherein
  (i) the first heterophasic propylene copolymer (HECO1) has a comonomer content in the range of 6.0 to 17.0 wt.-%, and/or
  (ii) the comonomer content of the xylene cold soluble (XCS) fraction of the first heterophasic propylene copolymer (HECO1) is in the range of 26 to 40 wt.-%.

14. The polyolefin composition according to claim 2, wherein the second heterophasic propylene copolymer (HECO2) has a comonomer content below 20.0 wt.-%.

15. The polyolefin composition according to claim 2, wherein the first heterophasic propylene copolymer (HECO1) comprises a polypropylene (PP1) as matrix and an elastomeric propylene copolymer (E1) dispersed in the matrix.

16. The polyolefin composition according to claim 2, wherein
  (i) the polyolefin composition comprises the first heterophasic propylene copolymer (HECO1) and the second heterophasic propylene copolymer (HECO2) in a weight ratio [(HECO1):(HECO2)] of 1.2:1 to 15:1, and/or
  (ii) the two heterophasic propylene copolymers (HECO1) and (HECO2) make up at least 50 wt.-%, preferably at least 70 wt.-%, of the polyolefin composition.

* * * * *